United States Patent Office 2,839,360
Patented June 17, 1958

2,839,360

METHOD FOR REDUCING THE CONCENTRATION OF ALKALI METAL SALTS IN CALCIUM CHLORIDE BRINES

J. R. Gump, Alma, and Herbert C. Wohlers, St. Louis, Mich., assignors to Michigan Chemical Corporation, St. Louis, Mich., a corporation of Michigan No Drawing. Application February 24, 1955
Serial No. 490,427

7 Claims. (Cl. 23—90)

This invention relates to the removal of alkali metals and their salts from calcium chloride brines and it relates more particularly to the reduction of alkali metal salts such as sodium and potassium chloride from brines of calcium chloride to reduce the amounts of alkali metal salts and other impurities below 5 percent total when projected to the solids basis so as to enable production of a relatively pure calcium chloride brine for use in the manufacture of pellets and the like having a calcium chloride purity of about 95 percent.

In the copending application of Abbott et al., Ser. No. 461,332, filed October 11, 1954, description is made of a method for the manufacture of pellets of calcium chloride wherein a brine of calcium chloride is increased in concentration to between 55–72 percent by weight calcium chloride and preferably within the range of 55–68 percent. While the brine is maintained at a temperature above its freezing point but slightly below its boiling point, it is introduced as by means of a spray, drip process or the like onto a hot bed of anhydrous calcium chloride pellets. The pellets which are wetted on their surfaces with the brine solution are tumbled and rolled en mass in a rotary kiln for passage downwardly through the kiln in counter-current flow with gases heated to a temperature sufficient to carry off the moisture from the pellets to the extent that the product delivered from the kiln is at maximum temperature and contains minimum moisture of about 0.5 percent by weight to produce anhydrous pellets. These are then sized for product and a certain proportion of the sized product along with the undersize and the crushed oversize are returned to the inlet end of the kiln for recycling to apply additional coats of calcium chloride brine thereon.

In the manufacture of pellets of the type described and the use of calcium chloride brines for other purposes, it is often desirable to secure a product having a purity of about 95 percent which permits less than 4.5 percent by weight alkali metal chlorides to be present when moisture and other materials are considered as a part of the impurities. In general, a great deal more sodium chloride and potassium chloride are present in the brine and it is an object of this invention to provide an economical and efficient method for reduction in the amount of alkali metal salts in such calcium chloride brines and it is a related object to provide a method for recovery of the alkali metal salts removed from the brine without interfering with the purification of the calcium chloride, without excessive loss of calcium chloride in the brine and without such expenses as would render recovery uneconomical.

Another object of this invention is to produce and to provide a method for producing anhydrous calcium chloride having less than 5 percent by weight impurity including water and the alkali metal salts such as potassium chloride, sodium chloride, lithium chloride and the like. It is a related object to provide a method for reducing the sodium chloride and potassium chloride in brines of calcium chloride without excessive increase in the cost of the process or the product and with substantially complete recovery of the alkali metal salts.

For purposes of illustration of the practice of this invention, description will be made first of a specific procedure for the reduction of alkali metal salts in brine employed in the manufacture of anhydrous calcium chloride pellets. It will be understood that these same procedures may be employed for the reduction in the amounts of sodium chloride and potassium chloride in brines of calcium chloride used for other purposes.

It has been found that strontium and lithium chloride are not factors that have to be considered in the impurities present in brines of calcium chloride because the amounts of lithium and strontium chloride in the raw materials of which the brine is formed are insignificant. The amount of sodium chloride and potassium chloride varies quite considerably but the total will in general be considerably greater than 5 percent when the calcium chloride brine is reduced to anhydrous condition. More often, the total of the alkali metal salts will exceed 6 or 7 percent and may range as high as 13 percent by weight or more of the final product.

EXAMPLE 1

Reduction in the amount of sodium chloride

The brine originally containing about 20 percent by weight calcium chloride is concentrated by evaporation, as in a triple effect evaporator, to increase the concentration of calcium chloride to about 41 percent by weight from which it is flashed at a temperature of about 135° F. to produce a calcium chloride solution of about 43–44 percent by weight. Under these conditions of calcium chloride concentration and temperature, the amount of sodium chloride which remains in solution is limited to about 0.73 percent by weight of the brine. The solubility of potassium chloride in a 43–44 percent calcium chloride brine at about 135° F. is about 6 percent. The amount of potassium chloride which will normally be present in brine of Example 1 is about 6 percent by weight which is considerably less than saturation and therefore the potassium chloride all remains in solution. All of the sodium chloride in excess of about 0.73 percent by weight crystallizes out and permits separation from the brine by filtration or else the brine may be separated from the salt by decantation. The sodium chloride is substantially pure salt and can be used as such or further purified if desired by recrystallization from solution.

It is desirable to flash the brine at the lowest economical flashing temperature because it has been found that the solubility of sodium chloride in the brine decreases with temperature and that the solubility is governed more by the temperature of the brine than the concentration of calcium chloride in the brine when the calcium chloride concentration is above about 40 percent. From the standpoint of economy, it is unnecessary and uneconomical to flash the brine at a temperature much below 130° F. while at a concentration of 43–44 percent calcium chloride. Higher temperatures may be used with correspondingly higher concentrations of sodium chloride remaining in the brine. Higher concentrations of calcium chloride may also be used as long as the temperature of the solution is not reduced below the point at which calcium chloride crystallizes, in order to prevent loss of calcium chloride and contamination of the precipitated sodium chloride. Highly concentrated calcium chloride solutions (above about 60 percent) cannot be used to advantage since calcium chloride will crystallize before reaching temperatures at which the sodium chloride solubility is desirably low.

EXAMPLE 2

Reduction in the amount of potassium chloride

Subsequent to the precipitation and separation of the sodium chloride, the brine is further concentrated to a calcium chloride content of about 68 percent by weight and raised to a temperature between 155–166° C. At this concentration, calcium chloride precipitates as the double salt $KCl \cdot CaCl_2$ when the potassium chloride is present in excess of about 1.86 percent by weight. The double salt which is formed precipitates from the solution and settles out for separation by decantation but preferably by filtration.

Whereas the reduction of sodium chloride in the brine of calcium chloride is influenced more by temperature than by the concentration of calcium chloride in the brine, the amount of potassium chloride that remains in the brine is influenced mainly by the concentration of calcium chloride as distinguished from the temperature of the brine. The requirements as to the temperature conditions are limited by the necessity to maintain the brine above the freezing point but below the boiling point of the brine solution.

At 62 percent concentration of calcium chloride in the brine, the double salt $KCl \cdot CaCl_2$ begins to form at a potassium chloride concentration in excess of 2.43 percent. The amount of potassium chloride capable of remaining in solution decreases at higher concentrations of calcium chloride in accordance with the following table.

TABLE I

[The solubility of KCl in concentrated $CaCl_2$ solutions at various temperatures (with varying NaCl concentrations).]

| Temp. ±5° C. | Percent $CaCl_2$ | Percent KCl |
|---|---|---|
| 130° C | 62.0 | 2.43 |
| 140° C | 63.0 | 2.32 |
| 147° C | 64.0 | 2.22 |
| 152° C | 65.0 | 2.12 |
| 157° C | 66.0 | 2.01 |
| 160° C | 67.0 | 1.92 |
| 162° C | 68.0 | 1.82 |
| 165° C | 69.0 | 1.72 |
| 169° C | 70.0 | 1.61 |

At 63 percent calcium chloride concentration, the freezing point of the brine is about 135° C. while the boiling point is at about 157° C. The range between the boiling point and the freezing point narrows at the higher concentrations to about 144° C. freezing point and 162° C. boiling point for brine concentrations between 65 and 66 percent calcium chloride and to 155° C. freezing point and 166° C. boiling point at 68 percent concentration of calcium chloride. While the temperature range between which the system may operate becomes narrower at higher brine concentrations, it is desirable to work with the brine at a concentration above 63 percent calcium chloride and preferably within the range of 68–70 percent calcium chloride and a temperature within the range of 160–165° C. to achieve a reduction in the amount of potassium chloride capable of reducing the alkali metal salt concentration to below 5 percent when the solution is corrected to a 95 percent calcium chloride solids basis.

In the product of Example 2, the 68 percent calcium chloride solution will contain about 1.14 percent by weight sodium chloride and about 1.8 percent by weight potassium chloride which, when projected to the anhydrous product, will yield a product having 95 percent by weight calcium chloride, 1.59 percent by weight sodium chloride, 2.52 percent by weight potassium chloride, leaving 0.89 percent by weight for other impurities including the amount of moisture remaining in the anhydrous product.

EXAMPLE 3

Recovery of potassium chloride from the double salt

The potassium chloride and the calcium chloride may be recovered from the precipitated double salt which is separated from the calcium chloride brine. For this purpose, the double salt is dissolved in water. The solution will hold about 3.8 percent potassium chloride when the amount of calcium chloride present is in the range of about 44 percent by weight and the temperature held at about 30° C. The remainder of the potassium chloride originally combined with the calcium chloride in the double salt is insoluble and therefore crystallizes out of the solution for separation by filtration, decantation, or the like separating means. The brine solution containing the 44 percent calcium chloride and 3.8 percent potassium chloride can be returned to the brine solution of Examples 1 and 2 for processing with the raw material in the manner described for the reduction of sodium chloride followed by the reduction in the amount of potassium chloride.

It will be apparent that the recovery of potassium chloride from the separated double salt does not depend on the amount of dilution of the double salt to a brine having a calcium chloride concentration limited to 44 percent by weight. It will be sufficient if the double salt is combined with water to any calcium chloride concentration wherein the amount of potassium chloride soluble therein is less than the amount of potassium chloride combined with the calcium chloride in the double salt. Under such conditions, some portion of the potassium chloride originally combined with the calcium chloride will remain insoluble in the brine solution for separation. The potassium chloride separated will be of a technical grade which can be purified by recrystallization by solution, by well known procedures.

It has been found that the amount of sodium chloride in the calcium chloride brine has little, if any, influence on the concentration at which the potassium chloride is precipitated from the solution as the double salt. In order to separate relatively pure materials capable of economical recovery, it is preferable to effect the separation of the sodium chloride at temperature and concentration conditions favorable to the greatest solubility of potassium chloride so that the potassium chloride will not separate out with the sodium chloride and interfere with the recovery of the alkali metal salts. It is preferred also to separate potassium chloride under conditions wherein the least amount of potassium chloride is soluble but at which the amount of sodium chloride which remains in the system is still soluble so that the sodium chloride will not separate out with the double salt of potassium chloride. These conditions are possible in a system of the type described because of the finding that the sodium chloride is influenced in its solubility mostly by temperature while the potassium chloride is not so that the sodium chloride can be separated by temperature reduction without precipitation of potassium chloride. On the other hand, the potassium chloride can be separated out by increase in the concentration of the calcium chloride brine accompanied with such increases in the temperature of the brine that the amount of sodium chloride in the solution is capable of remaining in solution under such higher temperature conditions.

It will be understood that these concepts may be adopted for use in the reduction of alkali metal salts in calcium chloride brines used for other purposes and that lower concentrations of brine and temperature may be employed for reduction of potassium chloride as the corresponding double salt where such impurity in the final product or where the presence of larger amounts of potassium chloride are not objectionable.

It will be further understood that changes may be made in the details of the concentrations, temperature conditions and methods of handling the materials and processing the materials, limited to the concepts described, without departing from the spirit of the invention, especially as defined in the following claims.

We claim:

1. The method for reducing the concentration of alkali metal salts in calcium chloride brines, comprising the steps of cooling the calcium chloride brine substantially independently of the concentration of calcium chloride in the brine to a temperature above the point at which calcium chloride crystallizes but below the temperature at which the concentration of sodium chloride capable of remaining in solution in the brine is less than the concentration of sodium chloride in the brine, separating the insoluble sodium chloride from the brine, removing water from the brine to increase the concentration of calcium chloride in the brine to between 63–70 percent by weight, maintaining the temperature of the brine above the point at which calcium chloride crystallizes but below its boiling point whereby the potassium chloride in the brine in excess of 2.32 percent by weight at the lower concentration to 1.61 percent by weight at the higher concentration forms into an insoluble double salt of $KCl \cdot CaCl_2$, and then separating the insoluble double salt from the concentrated brine solution.

2. In the method for reducing the concentration of sodium chloride and potassium chloride in brines of calcium chloride, the steps of cooling a calcium chloride brine in which the concentration of calcium chloride is between 20–60 percent by weight to a temperature above the point at which calcium chloride crystallizes but below the temperature at which the concentration of sodium chloride capable of remaining in solution in the brine is less than the concentration of sodium chloride in the brine, separating the insoluble sodium chloride from the brine, removing water from the brine to increase the concentration of calcium chloride in the brine to between 63–70 percent by weight, maintaining the temperature of the brine above the point at which calcium chloride crystallizes but below the boiling point of the brine whereby the potassium chloride in the brine in excess of 2.32 percent by weight at the lower concentration to 1.61 percent by weight at the higher concentration forms into an insoluble double salt of $KCl \cdot CaCl_2$, and then separating the insoluble double salt from the concentrated brine solution.

3. In the method for reducing the concentration of sodium chloride and potassium chloride in brines of calcium chloride, the steps of removing water from the brine to provide a brine having a calcium chloride concentration of about 43–44 percent, flashing the brine at a temperature of 130–135° F. whereby sodium chloride in amounts in excess of about 0.73 percent by weight is precipitated and becomes insoluble in brine, separating the insoluble sodium chloride from the brine, removing water from the brine to increase the concentration of calcium chloride in the brine to between 63–70 percent by weight, maintaining the temperature of the brine above the point at which calcium chloride crystallizes but below the boiling point of the brine whereby the potassium chloride in the brine in excess of 2.32 percent by weight at the lower concentration to 1.61 percent by weight at the higher concentration forms into an insoluble double salt of $KCl \cdot CaCl_2$, and then separating the insoluble double salt from the concentrated brine solution.

4. In the method of reducing the concentration of alkali metal salts in brines of calcium chloride, the steps of reducing the temperature of the calcium chloride brine substantially independently of the concentration of calcium chloride in the brine to a temperature above the point at which calcium chloride crystallizes to a temperature wherein a relatively low concentration of sodium chloride remains soluble in the brine, separating any insoluble sodium chloride from the brine, removing water from the brine to increase the concentration of calcium chloride in the brine to between 63–70 percent by weight, concurrently heating the brine to a temperature within the range of 135°–170° C., the final temperature being about 5° C. above the crystallization point of calcium chloride, whereby potassium chloride in the brine in amounts in excess of about 2.43 percent by weight forms a double salt with calcium chloride which is insoluble in the brine, and then separating the insoluble double salt from the concentrated brine solution.

5. In the method of reducing the concentration of alkali metal salts in brines of calcium chloride, the steps of reducing the temperature of the calcium chloride brine substantially independently of the concentration of calcium chloride in the brine to a temperature above the point at which calcium chloride crystallizes to a temperature wherein a relatively low concentration of sodium chloride remains soluble in the brine, separating any insoluble sodium chloride from the brine, removing water from the brine to increase the concentration of calcium chloride in the brine to between 68–70 percent by weight, concurrently heating the brine to a temperature within the range of 162°–169° C. whereby any potassium chloride over and above about 1.6–1.8 percent by weight forms into a double salt with calcium chloride which is relatively insoluble in the brine, and then separating the insoluble double salt from the concentrated brine solution.

6. The method as claimed in claim 1 which includes the additional steps of recovering the potassium chloride in calcium chloride from the double salt separated from the concentrated brine solution by dissolving the double salt in aqueous medium to form a calcium chloride brine solution in which the amount of potassium chloride soluble therein is less than the ratio of potassium chloride to calcium chloride in the double salt whereby the excess potassium chloride becomes insoluble in the brine solution, and removing the insoluble potassium chloride from the brine, and then returning the brine to the original calcium chloride brine.

7. In the method of reducing the concentration of potassium chloride in brines of calcium chloride, the steps of removing water to concentrate the calcium chloride brine to between 68–70 percent by weight calcium chloride, concurrently heating the brine to maintain a temperature within the range of 162°–169° C. whereby any potassium chloride in amounts in excess of 1.6–1.8 percent by weight forms a double salt with calcium chloride which is relatively insoluble in the concentrated brine solution, and then separating the insoluble double salt from the concentrated brine solution.

References Cited in the file of this patent

UNITED STATES PATENTS

| | | |
|---|---|---|
| 1,215,546 | Jones | Feb. 13, 1917 |
| 2,032,702 | Keene et al. | Nov. 3, 1936 |
| 2,556,184 | Hedley | June 12, 1951 |

OTHER REFERENCES

Lewis' book, "An Outline of First Year College Chemistry," page 219, sixth ed., revised, 1945. Barnes & Noble Inc., New York.